United States Patent
Dao et al.

(10) Patent No.: US 9,998,338 B2
(45) Date of Patent: Jun. 12, 2018

(54) SYSTEM AND METHOD FOR DYNAMIC EFFECTIVE RATE ESTIMATION FOR REAL-TIME VIDEO TRAFFIC

(71) Applicant: Huawei Technologies Co., Ltd., Shenzhen (CN)

(72) Inventors: Ngoc-Dung Dao, Ottawa (CA); Aaron Callard, Ottawa (CA)

(73) Assignee: Huawei Technologies Co., LTD, Shenzhen (CN)

( * ) Notice: Subject to any disclaimer, the term of this patent is extended or adjusted under 35 U.S.C. 154(b) by 489 days.

(21) Appl. No.: 14/657,965

(22) Filed: Mar. 13, 2015

(65) Prior Publication Data
US 2015/0264098 A1 Sep. 17, 2015

Related U.S. Application Data

(60) Provisional application No. 61/953,075, filed on Mar. 14, 2014.

(51) Int. Cl.
*G06F 15/16* (2006.01)
*H04L 12/24* (2006.01)
(Continued)

(52) U.S. Cl.
CPC ...... *H04L 41/5009* (2013.01); *H04L 43/0894* (2013.01); *H04L 47/14* (2013.01);
(Continued)

(58) Field of Classification Search
CPC . H04L 41/5009; H04L 43/0894; H04L 47/14; H04L 47/2441; H04L 65/2441;
(Continued)

(56) References Cited

U.S. PATENT DOCUMENTS 6,850,981 B1 * 2/2005 Ho ............... H04L 47/14
370/338
7,855,963 B2 12/2010 Ponnuswamy et al.
(Continued)

FOREIGN PATENT DOCUMENTS

WO 2008111930 A1 9/2008
WO 2010027343 3/2010

OTHER PUBLICATIONS

Callard, A., "Effective Bandwidth Estimation for Traffic Engineering," Huawei 5G White Paper Part 1, Supporting Document, Huawei Ottawa R&D Centre, Dec. 2013, 22 pages.
(Continued)

*Primary Examiner* — Jonathan A Bui
(74) *Attorney, Agent, or Firm* — Slater Matsil, LLP

(57) ABSTRACT

A method for effective flow rate estimation for a plurality of video flows includes determining a first flow rate of each of the plurality of video flows in a first transmission window and receiving quality of experience (QoE) feedback for playing portions of the plurality of video flows in the first transmission window. The QoE feedback is received from a plurality of user equipments (UEs) receiving the plurality of video flows. A dynamic effective flow rate is estimated for each flow in the plurality of video flows in a second transmission window in accordance with at least the first flow rates of the plurality of video flows and the QoE feedback.

23 Claims, 5 Drawing Sheets

(51) Int. Cl.
*H04L 12/801* (2013.01)
*H04L 12/26* (2006.01)
*H04L 29/06* (2006.01)
*H04L 12/851* (2013.01)
*H04N 21/61* (2011.01)
*H04N 21/647* (2011.01)
*H04W 40/08* (2009.01)
*H04W 52/26* (2009.01)
*H04W 52/14* (2009.01)
*H04L 12/853* (2013.01)

(52) U.S. Cl.
CPC ...... *H04L 47/2441* (2013.01); *H04L 65/4092* (2013.01); *H04L 65/80* (2013.01); *H04N 21/6131* (2013.01); *H04N 21/64738* (2013.01); *H04N 21/64792* (2013.01); *H04W 40/08* (2013.01); *H04W 52/143* (2013.01); *H04W 52/26* (2013.01); *H04W 52/267* (2013.01); *H04L 47/2416* (2013.01); *Y02B 60/50* (2013.01)

(58) Field of Classification Search
CPC . H04L 65/4092; H04L 65/2416; H04L 65/80; H04N 21/6131; H04N 21/64738; H04N 21/64792; H04W 40/08
See application file for complete search history.

(56) References Cited

U.S. PATENT DOCUMENTS

| | | | |
|---|---|---|---|
| 8,732,326 B2 | 5/2014 | Su et al. | |
| 9,294,411 B2* | 3/2016 | Hamdi | H04L 45/60 |
| 2003/0067877 A1* | 4/2003 | Sivakumar | H04L 47/2416 370/232 |
| 2003/0083088 A1* | 5/2003 | Chang | H04W 28/22 455/522 |
| 2004/0013207 A1 | 1/2004 | Sartori et al. | |
| 2005/0152397 A1* | 7/2005 | Bai | H04L 1/1887 370/468 |
| 2007/0280245 A1* | 12/2007 | Rosberg | H04L 47/10 370/392 |
| 2011/0211464 A1* | 9/2011 | Chetlur | H04L 41/5067 370/252 |
| 2012/0188882 A1* | 7/2012 | Wilkinson | H04L 41/5067 370/252 |
| 2013/0124746 A1* | 5/2013 | Arya | H04N 21/6125 709/231 |

OTHER PUBLICATIONS

Huang, Y. et al., "Downlink Power Control for Multi-User VBR Video Streaming in Cellular Networks," IEEE Transactions on Multimedia, vol. 15, No. 8, Dec. 2013, 12 pages.
Kim, I. et al., "An Optimum Power Management Scheme for Wireless Video Service in CDMA Systems," IEEE Transactions on Wireless Communications, vol. 2, No. 1, Jan. 2003, 11 pages.
Norros, I., "On the Use of Fractional Brownian Motion in the Theory of Connectionless Networks," IEEE Journal on Selected Areas in Communications, vol. 13, No. 6, Aug. 1995, 10 pages.
Pulipaka, A. et al., "Traffic and Statistical Multiplexing Characterization of 3D Video Representation Formats," IEEE Transactions on Broadcasting, Jun. 2013, 8 pages.
International Search Report and Written Opinion of the International Searching Authority received in Patent Cooperation Treaty Application No. PCT/US2015/020592, dated Jun. 26, 2015, 10 pages.

* cited by examiner

SYSTEM AND METHOD FOR DYNAMIC EFFECTIVE RATE ESTIMATION FOR REAL-TIME VIDEO TRAFFIC

This application claims the benefit of provisionally filed U.S. Patent Application Ser. No. 61/953,075, filed Mar. 14, 2014, and titled "System and Method for Dynamic Effective Rate Estimation for Real-Time Video Traffic," which application is hereby incorporated by reference.

TECHNICAL FIELD

The present invention relates to a system and method for dynamic effective rate estimation, and, in particular embodiments, to a system and method for dynamic effective rate estimation for real-time video traffic.

BACKGROUND

Real-time video traffic, such as video conferencing, generally exhibits a high peak-to-mean (P2M) rate ratio because of the video encoding methodology. In the video encoder, picture frames are encoded in a group-of-picture (GoP) structure. Each GoP consists of I-frames (independently encoded frames), P-frames (predictively encoded frames) and possibly B-frames (bi-directionally predicted frames). I-frames usually have a much larger size than P/B frames, and can be as much as 6 times larger. Therefore, the instantaneous bit rate of a real-time video flow has a high P2M ratio due to the transmission of I frames and P/B frames at different times.

During the delivery of video flow to different nodes, a plurality of video flows are typically transmitted over the same set channels between network nodes. When a large number of video flows are transmitted over the same set of channels, the I-frames are unlikely to be aligned with each other. As a result, the aggregated video flow typically has a lower P2M ratio than any of the individual flows. It should be understood that in the context of a wireless network, it is less common to have a plurality of video flows carried on the same wireless link, especially on wireless links between transmit points (TPs) such as base stations, and wireless terminals such as a user equipment (UE). If traffic to a UE is planned with sufficient capacity allocated to the video flow to allow the peak transmission rates to be accommodated, wireless links will have unused capacity, as sufficient capacity has been allocated for the transmission of I-frames, and much of the allocated capacity will be unused during the transmission of smaller frames. Thus, many of the problems dealing with the management of video traffic flows have been unaddressed in wireline networking because of the planning benefits of video traffic aggregation.

SUMMARY

An embodiment method for effective flow rate estimation for a plurality of video flows includes determining a first flow rate of each of the plurality of video flows in a first transmission window and receiving quality of experience (QoE) feedback for playing portions of the plurality of video flows in the first transmission window. The QoE feedback is received from a plurality of user equipments (UEs) receiving the plurality of video flows. A dynamic effective flow rate is estimated for each flow in the plurality of video flows in a second transmission window in accordance with at least the first flow rates of the plurality of video flows and the QoE feedback.

An embodiment method for power control includes determining data rates associated with traffic flows for radio nodes in a network for first transmission windows and estimating a dynamic effective flow rate of each of the traffic flows for a second transmission window and in accordance with at least quality of experience (QoE) feedback from user equipments (UEs) that are connected to the radio nodes and receive the traffic flows. A transmit power level is set for each of the radio nodes that maximizes an overall sum throughput of the radio nodes in accordance with the estimated dynamic effective flow rates of the traffic flows.

An embodiment method includes receiving quality of experience (QoE) feedback, at a network component and from a plurality of user equipments (UEs), for a first transmission window, wherein the QoE feedback is associated with traffic flows between a plurality of radio nodes and the UEs. For each of the traffic flows and based on the QoE feedback, a dynamic effective flow rate for the respective traffic flow in a second transmission window is estimated. Each of the plurality of radio nodes transmits the traffic flows with the estimated dynamic effective flow rates in the second transmission window.

An embodiment method for effective flow rate estimation for transmission of a video flow includes determining a flow rate associated with the transmission of the video flow in a first transmission window and receiving a Quality of Experience (QoE) feedback from a User Equipment (UE) receiving the video flow. The QoE feedback is associated with quality factors associated with playback of a portion of the video flow during the first transmission window. A dynamic effective flow rate is estimated for the video flow in a second transmission window in accordance with the determined flow rate and the received QoE feedback.

An embodiment network component includes a processor and a non-transitory computer readable medium connected to the processor. The non-transitory computer readable medium has stored thereon instructions that when executed by the processor cause the network component to determine a first flow rate of each of a plurality of video flows in a first transmission window and receiving quality of experience (QoE) feedback associated with playback of portions of the plurality of video flows in the first transmission window. The QoE feedback is received from a plurality of user equipments (UEs) receiving the plurality of video flows. The non-transitory computer readable medium further has stored thereon instructions that when executed by the processor cause the network component to estimate a dynamic effective flow rate for each flow in the plurality of video flows in a second transmission window in accordance with at least the first flow rates of the plurality of video flows and the QoE feedback.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
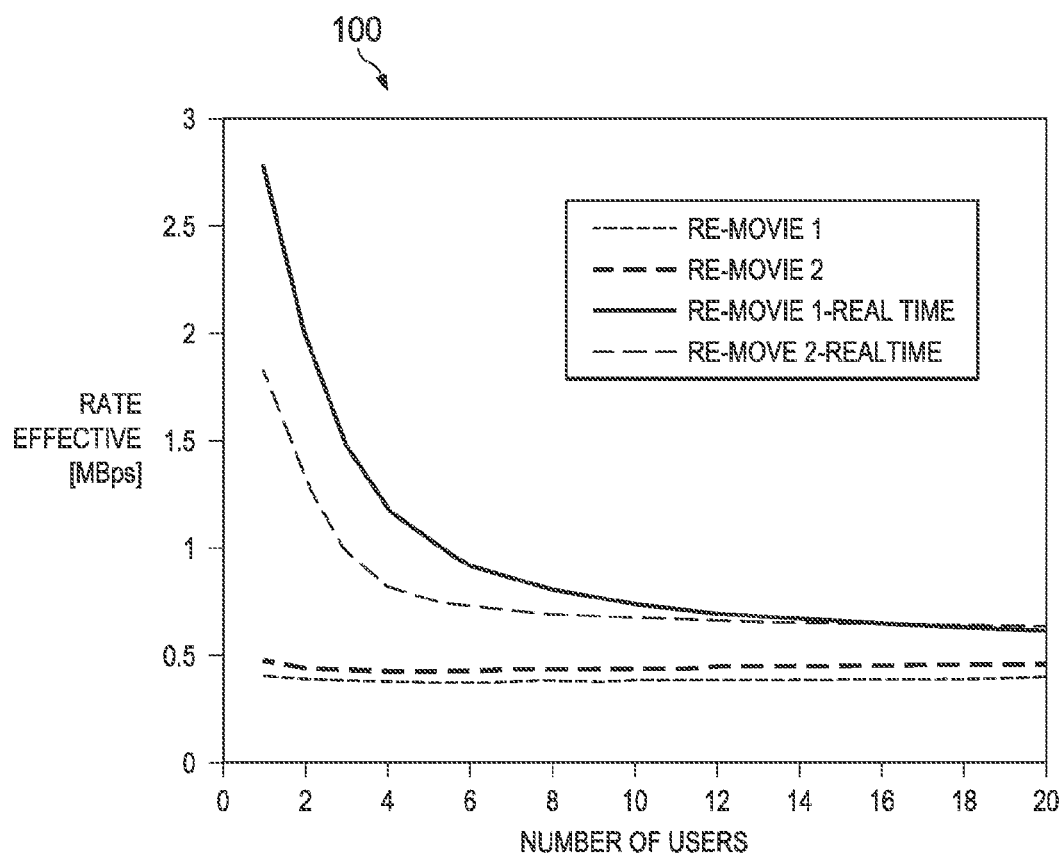
FIG. 1 illustrates effective rate as a function of number of video flows in an embodiment.

Initially, the effective bandwidth used by a node is the capacity to be provided to meet a specific quality of service (QoS) or quality of experience (QoE) of data and/or video flows. There are many ways to define the QoE. One possible definition of QoE is the outage time (freezing time of a user's display), e.g., outage time less than 5%. FIG. 1 shows chart 100 with an example of the effective rate of a node as a function of number of real-time video flows, where each video flow has nominal average rate of 0.5 Mbps. The curves show the average rate effective of a fixed capacity link (y-axis) which would be required for N users (x-axis) to simultaneously watch a video stream. Each user is assuming to be watching an different random portion of the video. Two video streams showing movies were testing in a buffering mode (Movie 1 curve and Movie 2 curve) and in a real-time streaming mode (Movie 1—Real Time curve and Movie 2—Real time Curve). These two videos were streamed to the users, and the users either buffered for up to 10 seconds (modeling causal non-real time video watching) and buffered for at most 100 ms (modeling real time conversational video. The curves illustrate that, the more users there are going through the same pipe, the less resources everyone needs individually, as they can share resource back and forth when needed.

In particular, this benefit is greater for real time traffic. Essentially, single video flows may have different P2M ratios, but multiplexed video flows, normalized by the number of video flows, have a monotonically decreasing P2M ratio as the number of flows increases. Nevertheless, the combined P2M of multiplexed video flows having the same mean rate is still larger than the mean rate of a single flow.

In order to provide a satisfactory QoS, traffic engineering nodes instruct the routers and other networking control points to provide a higher bandwidth to accommodate the peak rate of video flows. However, such methods are not necessarily compatible with wireless networks. A key difference between wired and wireless nodes is that the channel capacity of wireless users changes over the time due to a number of factors including time-varying fading channels and co-channel interference. The use of a QoE report from the user equipment permits characterization of the actual experience of the user instead of attempting to infer the video performance from channel state information.

The effective rate of transmissions by a particular node can be determined by using the QoE at each UE and actual rate transmitted to the UE from the node. The effective rate of transmission is used to determine a total transmission throughput for each wireless node in the communications network. An embodiment method dynamically estimates and adjusts the effective rate of real-time video flows passing through radio nodes of wireless networks.

Additionally, the effective rate can be used to determine whether admission is granted for new video flows through a particular node. Traffic engineering may also use the effective rate at wireless nodes for path selection and resource allocation. In the context of radio coordination, specifically power control for multiple radio nodes, the effective rate is an input to determine or adjust transmission parameters of radio nodes.

The effective rate of multiplexed real-time video flows of a network node is the bandwidth in bits per second (bps) to be provided by a network node in order to forward a number of real-time video flows to multiple user equipments such that a predefined percentage of flows has satisfactory QoE performance.

In conventional wireline networks, the bandwidth of a wireline node is stable over time. Therefore, the effective rate of multiple flows can be roughly estimated assuming some specific statistical distribution of video flows (mean and variance of bit rate), and video encoding GoP structure (e.g., frequency of I frame). One example of effective rate calculation is given below in Equation 1.

$$r_{eff} \approx r_{mean} + \sqrt{\frac{\sigma}{N}} \tag{1}$$

where σ and N are the variant of bit rate and number of users, respectively.

However, in wireless networks, the channel capacity of the users' wireless channels is different, and each user's channel is varying. The total required bandwidth of all the wireless channels from a radio node to satisfy QoE of real-time video flows is time-varying because the effective channel capacity of each user's channel varies. In wireless networks, users' channel capacity changes resulting in required bandwidth (Hz) changes. Further, users may watch movies with different bit rates, different encoding or different video parameters.

It has been determined that an embodiment approach to estimate the dynamic effective rate of multiple real-time video flows utilizing QoE/QoS feedback from users can account for the varying wireless connection conditions. QoE/QoS feedback can be used in video communications to exploit the actual perceived QoE/QoS from users to improve the user perceived QoE. In an embodiment, the time that a video feed is out, or lags, buffers or otherwise stops due to inadequate data flow is captured by a component at the user equipment. The outage is reported back to the network controller and is used to adjust the flow rate of video data to that particular user equipment. In some embodiments, multiple video feeds each have their individual outage statistics reported so that the flow rate of the different streams to the user equipment can be individually adjusted. It has also been determined that estimating the effective rate of flow and the effective bandwidth for multiple real-time video flows provides efficient use of available transmit power in a wireless communications system while providing maximized real-time video quality for all users.

Figure 2:
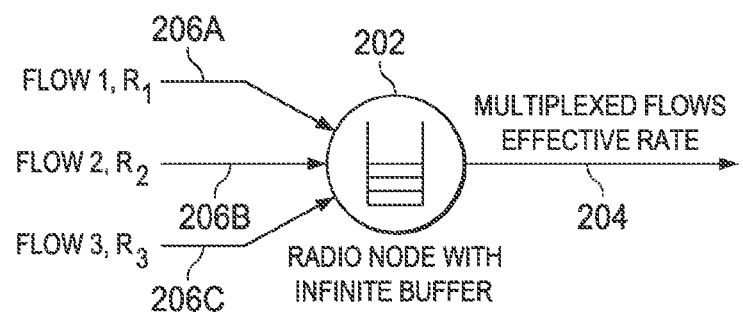
FIG. 2 is a logical diagram illustrating a model of single radio node with multiple input video flows.

FIG. 2 is a logical diagram illustrating the effective flow rate for multiple real-time video flows 206A . . . 206C according to an embodiment. In FIG. 2, a model of single radio node 202 with infinite buffer with multiple input flows 206A . . . 206C and multiplexed flows effective rate 204 is illustrated. The infinite buffer is assumed so that no packet is dropped by the radio node 202. Only the packet delay at the radio node 202 causes the degradation of QoE/QoS of real-time video flows. Thus, during calculations of the effective flow rate $R_e$, the effects of hardware limitations are ignored, and in some embodiments, are managed in engineering traffic on the wireline side of the communications network.

Figure 3:
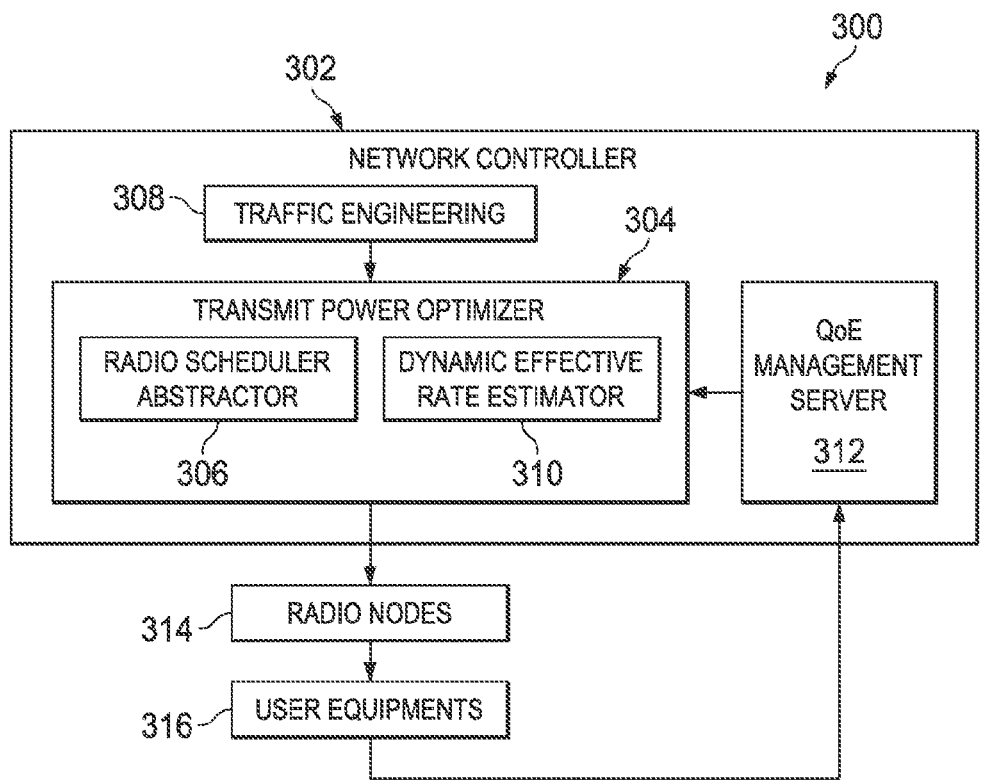
FIG. 3 is a block diagram illustrating a system for implementing a power control method using an effective rate estimation according to an embodiment.

FIG. 3 is a block diagram illustrating a system 300 for implementing a power control method using an estimated effective rate according to an embodiment. The system 300 includes a network controller 302 in communication with one or more radio nodes 314. The network controller 302 is, in some embodiments, a controller for a telecommunications network such as an Evolved Packet Core (EPC) system used for long term evolution (LTE) telecommunications standards. The network controller 302 is disposed in, for example, a mobility management entity (MME) or serving gateway (S-GW), and which coordinates radio resource across multiple radio nodes 314. In some embodiments the network controller 302 has modules that are disposed across multiple hardware devices, with the modules communicating to coordinate traffic management, radio scheduling and transmission power coordination.

The network controller 302 includes a transmit power optimizer 304 and traffic engineering module 308. The transmit power optimizer 304 handles the determination of transmit power for each communications flow at each radio node 314, and coordinates power allocation for the radio nodes 314. The transmit power optimizer 304 receives traffic data information from the traffic engineering module 308 as input. The traffic engineering module 308 communicates to the transmit power optimizer 304 regarding which traffic flows will go to which radio nodes 314, and the measured rate in previous window and allocated data rate of traffic flows.

The transmit power optimizer 304 has a radio scheduler abstractor 306 and a dynamic effective rate estimator 310. The radio scheduler abstractor 306 and dynamic effective rate estimator 310 may be, in some embodiments, separate software modules installed in the network controller 302 as part of the transmit power optimizer 304, hardware modules connected to the network controller as part of a physical layer controller, back plane or the like, or a combination of hardware and software modules. In other embodiments, the radio scheduler abstractor 306 and dynamic effective rate estimator 310 may each be distributed across multiple hardware devices such as radio nodes 314, network controllers, MMRs, S-GWs or the like. For example, a network controller 302 that controls multiple radio nodes 314 using multiple MMRs may have a radio scheduler abstractor 306 deployed at each MMR to report radio scheduling to a centralized transmit power optimizer 304. Such a system may also have dynamic effective rate estimators 310 deployed in multiple radio nodes 314, in central radio controller units, or in MMRs or S-GWs. The dynamic effective rate estimator 310 may estimate the effective rate of flow for video flows transiting the relevant hardware, and may report the flow rates to the centralized transmit power optimizer 304.

The radio scheduler abstractor 306 that provides an abstract of the packet scheduler for the radio nodes 314. For example, the radio scheduler abstractor 306 may be disposed in the network controller 302, and can be a proportional fairness (PF) scheduler or packet-delay aware scheduler. The radio scheduler abstractor 306 may be, for example, a software or hardware component in communication with the radio scheduler, and that provides data to the transmit power optimizer 304 for tuning the bandwidth and transmit powers of individual flows through the radio nodes 314. An embodiment uses a max-rate scheduler as an abstraction of radio node schedulers. The max-rate scheduler ranks users according to their channel quality, and the users with better channel quality are scheduled until no more bandwidth is available.

The radio nodes 314 are, in some embodiments, evolved UMTS Terrestrial Radio Access (E-UTRAN) Node B elements (eNBs), or another device providing a wireless link with UEs 316, and in other embodiments, the radio nodes 314 are other types wireless communications nodes. The radio nodes 314 have the ability to dynamically adjust the power, bandwidth and/or other radio parameters affecting communication from the radio nodes 314 to the UEs 316. The UEs 316 provide QoE information to a QoE management server 312 at the network controller 302, which uses the QoE information in the dynamic effective rate estimator 310 to adjust and estimate the effective rate of flow for each flow in successive transmission windows. In some embodiments, the QoE information is gathered on each UE 316 by software components deployed on the UEs 316. For example, a video player on each UE 316 may have QoE gathering capabilities, and may detect when a video buffer underrun occurs, signifying that the video player has played all the available data and is waiting on additional video data. Such a buffer underrun shows to the user as a lagging or stopped or erroneously displayed video since the player displays the video data at a faster rate than the video data is received. The video player may determine the percentage of time in a predetermined period that the video play was out or unavailable or displayed erroneously decoded picture frames, and report that as the QoE data.

Figure 4:
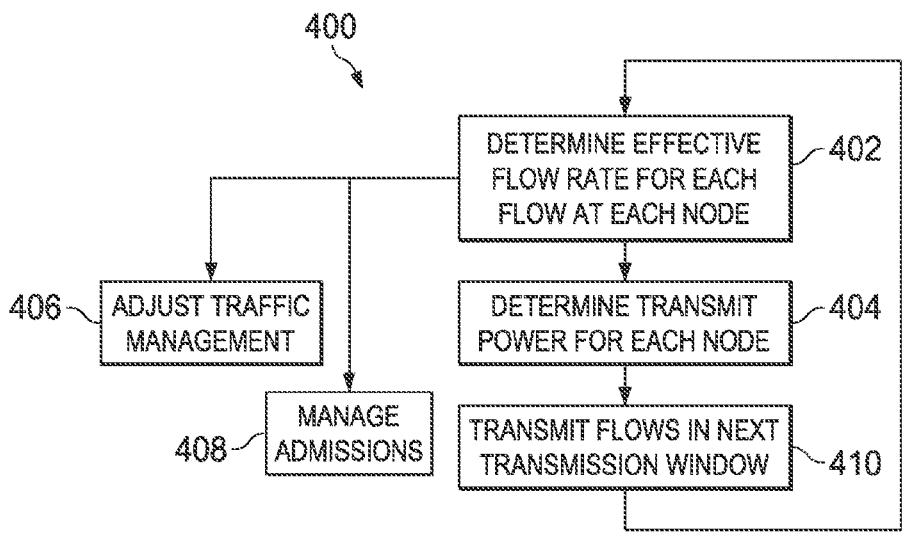
FIG. 4 is a flow diagram illustrating a method for determining video flow rates using dynamically estimated flow rates and transmission power control according to some embodiments.

FIG. 4 is a flow diagram illustrating a method 400 for determining video flow rates using dynamically estimated effective flow rates and transmission power control according to some embodiments. The method 400 illustrates an embodiment of a transmission power control method used with a dynamically estimated effective flow rate method. In some embodiments, a first measured flow rate for a first transmission window or a nominal average flow rate is used to estimate a second effective flow rate of a second, subsequent transmission window. In block 402, the effective flow rate of each flow at each node 314 is determined for a second transmission window. After the data is transmitted in the first transmission window, the effective flow rate for the next transmission window is determined by dynamically estimating the effective flow rate based on the measured or nominal average flow rate in the previous window. The dynamically estimated effective flow rate is the rate at which the method has determined that data rate should be allocated to a video flow to achieve the desired QoE at the UE 316.

In some embodiments, the effective flow rate for the second transmission window is estimated by utilizing the measured flow rate from the first transmission window to calculate a second effective flow rate for the second or next transmission window. In other embodiments, the effective flow rate is estimated utilizing the nominal mean rate of flow through a node, in a group of nodes, in the network, or the like. In such an embodiment, the first flow rate may be the mean flow rate of this flow. The second effective flow rate may be estimated by adjusting the first flow rate in response to QoE feedback from the UE, or by adjusting the flow rate to accommodate a modified transmit power, additional communications or flows being added to or removed from the equipment, or based on other factors affecting the channel or transmission quality. Adjustment of the flow rate may include adjusting the bandwidth allocated to a flow, the transmit power of a flow, the resources allocated to a flow, a combination of one or more of the same, or other adjustment techniques.

In block 404, a transmit power for each radio node 314 is determined. The estimated flow rates from block 402 are used to determine a power level for each radio node 314 that provides the desired throughput for the maximum number of flows at each respective radio node 314. The transmit power determination and the dynamic estimation of flow rates is described in greater detail below. While the flow rate estimation or determination and the transmit power determination are shown as separate blocks or steps, it should be understood that the flow rate and transmit power may be concurrently or jointly determined or optimized using, for example, a Lagrange multiplier approach or another technique.

In block 410, the flows are transmitted at the determined transmit power in the next or second transmission window to the respective UEs 316. In some embodiments, the method continues by repeating blocks 402, 404 and 410, with the flow rate determined for each flow used as the basis for the determination of the flow rate in block 402.

The effective flow rate, in some embodiments, is used to adjust traffic management or traffic engineering in block 406. Such adjustments may be made by sending messages to the traffic engineering module 308, by reporting estimated effective flow rates through a node, requesting reassignment of one or more flows to different equipment or the like. In some embodiments, messages having information related to the flows and power allocation may be sent to the traffic engineering module 308, which may reroute flows based on, for example, the inability of a radio node to handle the bandwidth required for one or more flows, the rejection of new flows, or the like.

The network may also manage admissions in block 408, and the admissions may be based on the estimated effective flow rates. For example, the bandwidth required for all of the flows through a radio node 314 may be determined during the traffic engineering optimization, and that total required bandwidth may be less than the bandwidth capacity of the radio node 314. In such a scenario, the radio node 314 or transmit power optimizer 304 may receive a request for admission of new video flows, and may signal the traffic management module 308, or to another component, such as an MMR or S-GW, that additional flows are acceptable. Alternatively, the excess bandwidth may be tracked by the traffic engineering module 308 and/or transmit power optimizer 304, which may signal acceptance of new flows during transfer or initiation of a connection through the radio node 314.

Figure 5:
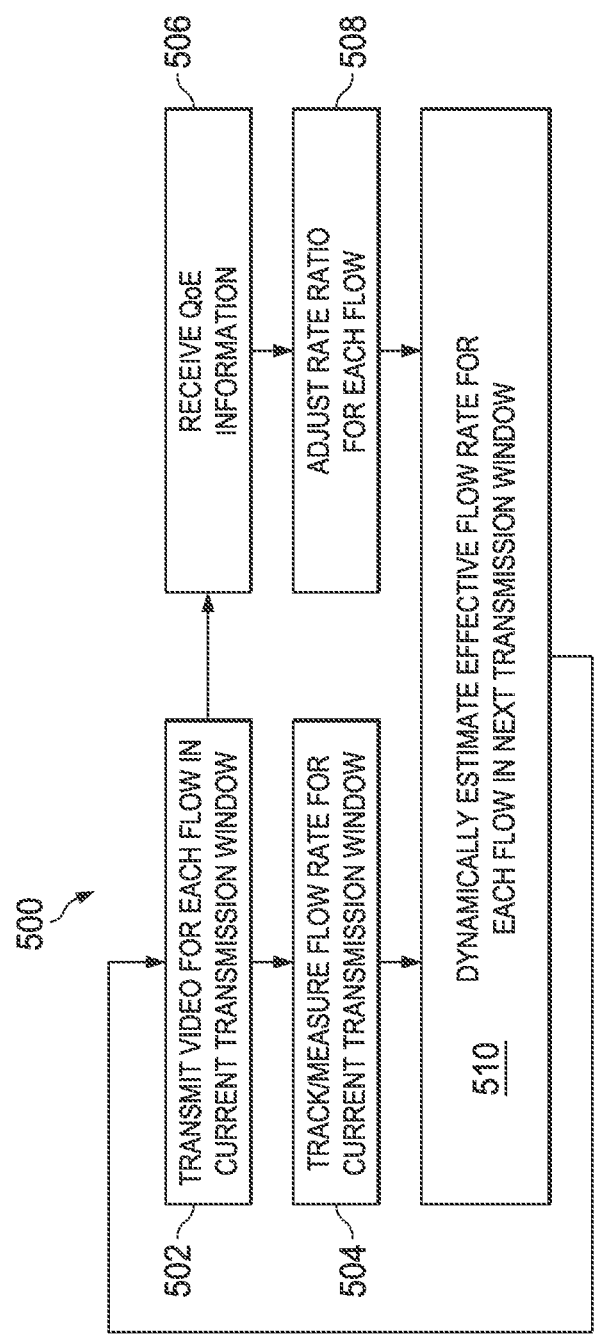
FIG. 5 is a flow diagram illustrating a method for dynamically estimating flow rates according to some embodiments.

FIG. 5 is a flow diagram illustrating a method 500 for dynamically estimating effective flow rates according to some embodiments. In block 502, video is transmitted in a current transmission window for each flow. The transmission may be performed according to a previously estimated effective flow rate, or may be transmitted with an initial effective flow rate, for example, in the first transmission for a particular video flow where no QoE exists for previous transmission windows.

In block 504, the flow rate for the current transmission window is tracked, measured or otherwise determined. In some embodiments, the data transmitted from a UE 316 in a first transmission window is calculated or measured for a predetermined period of time, and in other embodiments, the amount of data transmitted is determined prior to transmission of the video in block 502 from the data rate and time period of the current transmission window, by direct measurement of the transmitted data, or by another process. In yet another embodiment, the nominal mean flow rate is used to determine the effective flow rate. In such an embodiment, the mean rate of video flow may be tracked by, for example, the network controller 302, transmit power optimizer 304, or radio scheduler abstractor 306 and may be updated by an application, service or the like when a user is admitted to, the network.

With dynamic effective rate estimation, the effective rate $R_e(t)$ of multiplexed video flows passed through a radio node is a time-varying variable and is the summation of dynamic effective rate of individual flows $R_{e,i}(t)$:

$$R_e(t) = \sum_{i=1}^{N} R_{e,i}(t) \quad (2)$$

and $$R_{e,i}(t) = \alpha_i(t) r_i(t) \quad (3)$$

where $r_i(t)$ is the rate of flow i measured in the previous window, $\alpha(t)$ is the dynamic-to-measured (D2M) rate ratio that is adjusted depending on the QoE/QoS feedback. The rate ratio is adjusted to vary the effective rate, so the dynamic effective rate of individual flows $R_{e,i}$ is a time-varying function, depending on its previous value and the QoE/QoS feedback information.

This can be extended to users with different spectral efficiencies $S_i$ by the effective bandwidth ($BW_e$) requirement:

$$BW_e(t) = \sum_{i=1}^{N} \frac{R_{e,i}(t)}{S_i} \quad (4)$$

In Equation 4, $$BW_e(t) = \sum_{i=1}^{N} \frac{R_{e,i}(t)}{S_i}$$

is the effective bandwidth used by a particular flow i at a particular time t and is determined by the effective rate of flow $R_{e,i}(t)$ divided by the spectral efficiency $S_i$. Thus, the effective bandwidth at a node at a particular time ($BW_e(t)$) is the sum of the bandwidth used by each flow through a particular node.

In QoE information is received for each flow in block 506. In an embodiment, the adjustment to the effective rate for each flow is made based on the QoE information, which reflects the amount of time in a transmission window that video play at the UE 316 fails or displays erroneously decoded video frames. For example, if the QoE feedback is sent from UEs every x=2 seconds, the QoE feedback information includes the outage time in the last x seconds. The outage time $O_t$ is defined as the total time (in seconds) the video player stops playing due to missing video frames or displays erroneously decoded video frames in the transmission window. Thus, the outage time $O_t$ for a particular transmission window can be determined, and knowing the length of the transmission window, the percentage of the transmission window that was an outage, or the ratio of outage to the overall transmission window can be determined. Furthermore, the QoE maybe accumulated to determine the overall outage time during a playback.

In block 508, the rate ratio for each flow is adjusted. From the outage time in the last reporting period or transmission window reported as part of the QoE, the total outage ratio $P_t$ (equal to the ratio of total outage time and total session time) is calculated, and the rate ratio $\alpha_i(t)$ adjusted, if necessary according to the limits of Equations (5) and (6)

If $P_t < P_{threshold}$ and $O_t < O_{threshold}$, then $\alpha_i(t) = \alpha_i(t-1) - \Delta$ (5)

If $P_t > P_{threshold}$ and $\alpha_i(t) < \alpha_{i,threshold}, \alpha_i, O_t < O_{threshold}$, then $\alpha_i(t) = \alpha_i(t-1) + \Delta$ (6)

The threshold values $P_{threshold}$, $O_{threshold}$ and $\alpha_{i,threshold}$ can be predefined. In one example, $P_{threshold} = 0.05$, $O_{threshold} = 5$ seconds and $\alpha_{i,threshold}$ is the maximum D2M rate ratio of flow i, which is set to the measured P2M ratio of the flow. The $\Delta$ symbol represents a step or change in the rate ratio $\alpha_i(t)$, which can be 5% of the $\alpha_{i,threshold}$. In some embodiments, step $\Delta$ is variable or can be changed for different transmission windows, permitting greater rate tuning flexibility. Thus, in such an example, for a current video playback duration of 100 seconds, where a UE 316 experiences a video playback outage of 2 seconds, the overall outage ratio $P_t$ would be less than 0.05 ($P_t = 2$ seconds of outage/100 current playback duration=0.02) and $O_t$ would also be less than 5 seconds. Thus, at the point that a video has played back for 100 seconds, a total outage time of 2 seconds would result in a 2% overall outage ratio that would be lower than the acceptable outage ratio of 5%. With such a delay, the rate ratio $\alpha_i(t)$ would be reduced from the rate ratio of the previous transmission window according to Equation (5) since the QoE is tolerable. Similarly, if the outage was greater than 6 seconds, then $P_t$ would be greater than 0.05 ($P_t = 6$ seconds of outage/100 current playback duration=0.06). If the rate ratio $\alpha_i(t)$ is less than the rate ratio threshold $\alpha_{i,threshold}$ (which is equal, in some embodiments, to the maximum D2M rate ratio), then the rate ratio $\alpha_i(t)$ is increased from the rate ratio of the previous window according to Equation (6) since the QoE is below the acceptable value, indicating that the user is experience sub-par video playback performance. In some embodiments, a condition to reduce the rate ratio may be where no outage happened in one or several most recent measurement or transmission windows.

The initialized value of $\alpha_i(t)$ can be any number larger than 1 and smaller than the statistical P2M ratio of real-time video flows. In particular, the initialized value can be trained by data mining, by using the past experience to come up with a better initialized value. The initialized value of $\alpha_i(t)$ may be used to adjust the flow rate used for a first transmission window and generate a effective flow rate for the second transmission window since no previous rate ratio will have been applied to the first transmission window.

Additionally, while the above examples describe estimating the rate ratio $\alpha_i(t)$ by adjusting the rate ratio from the previous transmission window using a fixed step size $\Delta$, the embodiments are not limited to such an embodiment. Additionally, the adaptation of step size $\Delta$ can also be made dynamic. In some embodiments, the step size $\Delta$ is modified according to a nonlinear function to speed up the convergence of QoE of all users to their expected value when users enter or exit the network.

In other embodiments, techniques for modifying the rate ratio $\alpha_i(t)$ may also include proportional (P, shown in Equation (7)), proportional integral (PI, shown in Equation (8)), or proportional integral differential (PID, shown in Equation (9)) controllers given by the following exemplary formulas:

$$P: \alpha_i(t) = K_P * f(P_t - P_{target}) \tag{7}$$

$$PI: \alpha_i(t) = K_P * f(P_t - P_{target}) + K_I \Sigma_{t=o}^{t} g(P_t(t) - P_{target}) \tag{8}$$

$$PID: \alpha_i(t) = K_P * f(P_t - P_{target}) + K_I \Sigma_{T=o}^{t} g(P_t(t) - P_{target}) + K_D * h(P_i(t) - P_i(t-1)) \tag{9}$$

where f, g and h are simple functions and $K_P$, $K_I$ and $K_D$ are gain coefficient constants. It should be understood that these controller techniques are meant to be illustrative examples, and are not limiting. Additionally, to gain faster response time, $P_t$ could be also be defined in such a way that negative values could occur, for instance amount of unused data such as, for example, for scalable video coding (SVC), or the like.

The above-described rule generally makes sure that the effective rate of flow can be reduced as long as the long-term QoE performance can be met and the outage that happened in the last reporting period is acceptable. Conversely, the individual dynamic effective rate can be increased if users have experienced poor QoE.

In block 510, the estimated effective flow rate $R_{e,i}(t)$ for each flow in a next or subsequent transmission window is dynamically determined. In some embodiments, the effective flow rate $R_{e,i}(t)$ is estimated by adjusting a previous measured flow rate or mean rate, such as that determined in block 504, by the rate ratio $\alpha_i(t)$ that is adjusted, if necessary, in block 508. The effective flow rate $R_{e,i}(t)$, is in some embodiments, determined from the previously measured rate multiplied by the rate ratio $\alpha_i(t)$, as shown in Equation (3). Video data for each video flow may then be transmitted in block 502 at the estimated effective flow rate $R_{e,i}(t)$ determined in block 510, with the method 500 repeating until the video flow terminates.

The adjustment of the rate ratio gives a target effective flow rate $R_{e,i}(t)$ for each flow. In some embodiments, the effective flow rate $R_{e,i}(t)$ for each flow may be provided by radio nodes by adjusting the allocated bandwidth for each flow. For example, the bandwidth and/or resource allocated to each flow may be adjusted by adjusting the transmission bandwidth, modifying transmission parameters such as coding scheme, modulation, or the like. In other embodiments, the effective flow rate $R_{e,i}(t)$ for each flow may be provided for each flow by adjusting the spectral efficiency through modifying the channel transmit power for the flow, the coding or compression scheme, frequency reuse or other transmission parameters.

Figure 6:
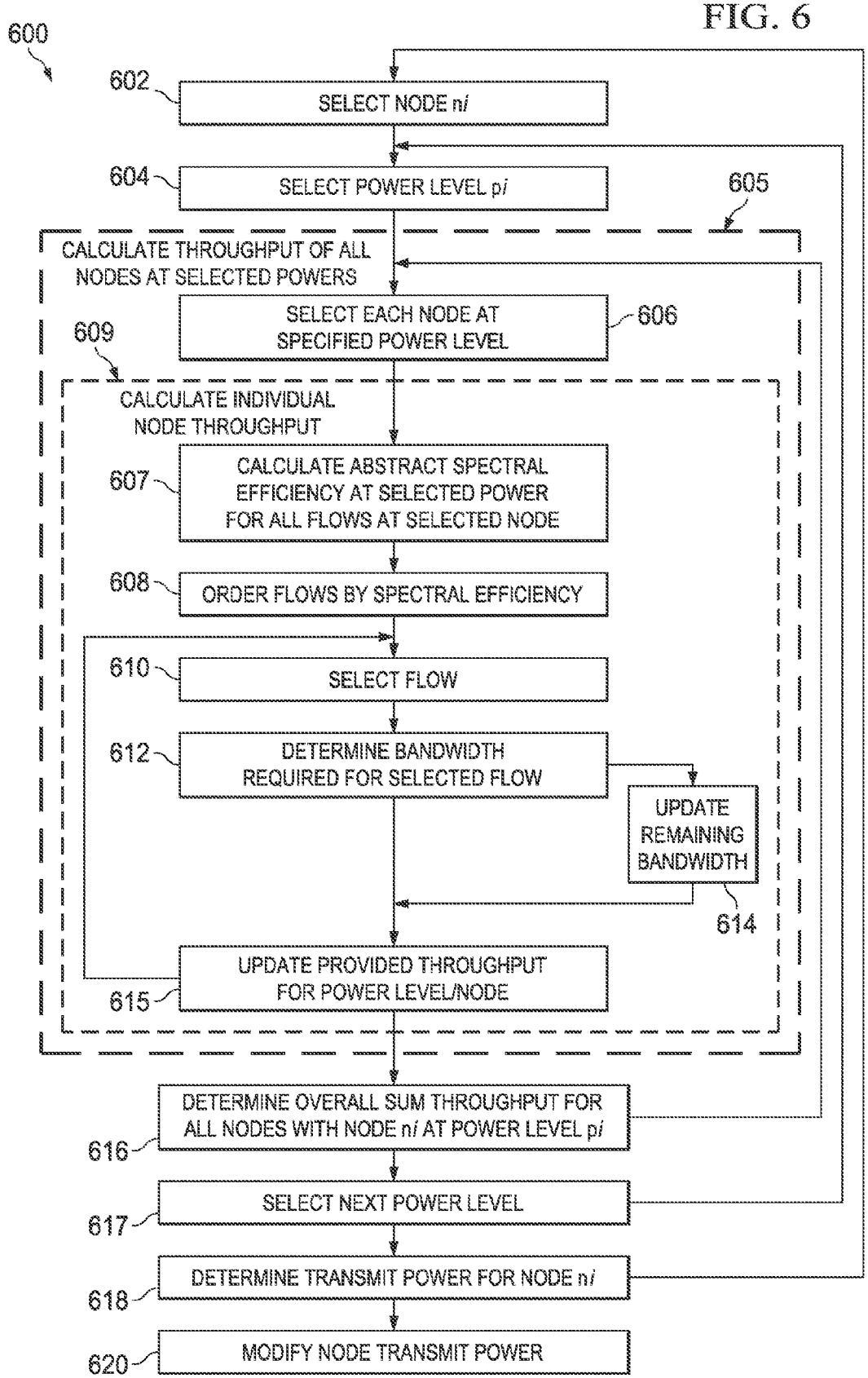
FIG. 6 is a flow diagram illustrating a method for controlling power of node transmissions according to some embodiments.

FIG. 6 is a flow diagram illustrating a method 600 for controlling power of node transmissions according to some embodiments. With multiple users accessing the same radio nodes 314, each user's flow rate affects the QoE of other users. Additionally, traffic events such as new user arrivals/departures affect the number of flows and each user's QoE. In some embodiments, the impact of one user's data on other users can be captured and used to adjust the transmissions of other users. Thus the rate ratio $\alpha_i(t)$ could also be updated for other users as well, using different K values. These updates could be maintained separately so that when a user goes away, for example, by stopping a video flow or leaving a particular node, its increase to the overall $\alpha_t(t)$ also goes away. For example, the overall rate ratio $\alpha_t(t)$ for all flows through a node may be determined according to Equation 10:

$$\alpha_i(t) = \alpha_{i,self}(t) + s_i \Sigma_{j \neq i} \alpha_j(t) \qquad (10)$$

where the values of $s_i$ are tuned to reflect the mutual usage of resources. The simplest solution has all the $s_i$ values the same. In some embodiments, the systems use solutions with a larger $s_i$ for users with similar channel parameters or path loss. This is because users with similar channel parameters are better able to trade off resources.

With respect to the power control method 600, the transmit power of multiple radio nodes 314 can be coordinated such that the overall network performance is improved. The power control problem applies to various types of traffic, including real-time video traffic. For example, some embodiments may include methods for fast (instantaneous) power control, which take into account the size of video packets. However, while this approach minimizes the transmit power of each radio node 314, it has been determined that the fluctuation of the transmit power actually causes significantly varying interference to UEs 316 in neighboring cells. This would make the channel state information (CSI) feedback less accurate. Consequently, actual benefits of fast power adaptation may be marginal.

It has also been determined that using the dynamic effective rate for power control may be more advantageous over fast power control, best effort traffic, or other power control techniques. Under some embodiments of the power control with estimated effective flow rates, the transmit power is slowly changed, resulting in improved accuracy of CSI feedback over fast power control. Additionally, fast power control requires frequent optimization, which may be computationally expensive compared to estimating the effective flow rate. Furthermore, in addition to the real-time video traffic, users may also have other traffics such as web browsing requests, voice calls, or the like. Using the effective flow rate of video flows provides transmission room or resource availability for other flows with less stringent QoE requirements than those required by, for example, best effort traffic.

The power control method 600 may, in some embodiments, be implemented by the transmit power optimizer 304. The power control method 600 searches for the best power levels of radio nodes 314 from a set of possible transmit powers. For each power level and each radio node 314, a power level is selected if it gives the largest total throughput of all radio nodes 314. The power control method 600 comprises looping through each node 314, and for each node 314, looping through each transmit power level to determine the throughput provided by the all of the node when the node 314 is at each power level. The transmit power level for each node is the power level that provides the greatest throughput for all radio nodes 314. In some embodiments, the effect of the power level of each node 314 is considered, so that the power levels of the various radio nodes 314 are calculated with respect to each other.

In an embodiment, in block 602, a node $n_i$ is selected, with $n_i=1$ to N. Block 604 through 618 are performed for each node $n_i$ to determine the transmit power for the node. In block 604, a power level $p_i$ of node $n_i$ is selected with $p_i=1$ to K. Blocks 606 through 617 are repeated for each node $n_i$ at each power level $p_i$ to determine the throughput of the system when node $n_i$ is assigned each power level. For each node $n_i$ at each power level $p_i$, the throughput of all nodes at selected powers in is calculated in block 605. Block 605 may comprise, selecting each node at a specified power level in block 606 and then calculating the throughput for each individual node at the specified power level in block 609. The selected powers comprises, in some embodiments, the power level $p_i$ for the selected node $n_i$. Additionally, for nodes where optimum transmit power has been determined in a previous iteration of blocks 604 through 618, the determined transmit power is used to calculate the overall sum throughput for all the nodes when testing all power levels for node $n_i$. Similarly, in some embodiments, for nodes other than $n_i$ where the transmit power has not yet been determined, the specified power may be set to the maximum power for the node.

Thus, for example, in a system with 3 nodes, at 3 power levels, the first node is selected in block 602, and the first power level for the first node is selected in block 604. In block 606, the first node is assigned the first power level, and the second and third nodes are assigned a maximum power level, which, in some embodiments, maybe the highest or third power level, or may be another maximum power level. The throughput of each of the nodes is then calculated in block 609, and the process is repeated for the two remaining power levels assigned to the first node. After an overall sum throughput is determined for each power level assigned to the first node, the power level that provides the greatest overall sum throughput is determined to be the transmit power level for the first node. The process is repeated for each node using the determined transmit power for the preceding nodes. Thus, for the second node, the power specified in block 606 for the first node is the first node's optimized power level, while third node is assumed to operate at the maximum power. Similarly, the third node's transmit power is determined by calculating the throughput of all nodes at each power level for the third node and with the first and second nodes assumed to be transmitting at the previously determined transmit power level.

The sum throughout for each of the nodes at the specified power levels is calculated in block 609 by the radio scheduler abstractor 306 performing blocks 607 through 615.

For the calculation of the sum throughput for the set of all flows F, for each power level $p_i$ of each node $n_i$, calculation variables are initialized by setting sum of provided throughput C=0, and available bandwidth B to the total available bandwidth of the radio node $n_i$.

In order to calculate the sum throughput for each flow at a given transmit power, the spectral efficiency (SE) (in bit/s/Hz) of all users is calculated, with the SE used to determine the required bandwidth for each flow. The SE may, in some embodiments, be determined by a mapping function that relates the signal-interference-plus-noise ratio (SINR) to the SE. Thus, in block 607, the abstract SE of each flow $S_i$ (i=1 to M) for the current transmit powers of radio nodes is calculated.

In block 608, the set of flows F is ordered by decreasing magnitude of each flow's SE. In block 610, a flow from ordered set F is selected by, for example, the radio scheduler abstractor 306 which selects the users or flows with highest SE first. In block 612 the bandwidth required to meet the dynamic effective rate of the selected flow is calculated, for example, according to Equation (11):

$$b_i = R_{e,i}/S_i \qquad (11)$$

In Equation (11), $b_i$ is the required bandwidth for flow i, and $R_{e,i}$ is the dynamic effective rate of individual flow i that is, in some embodiments, calculated using the dynamic flow rate estimation method 500 described above. Thus, the required bandwidth $b_i$ for a particular flow is determined from the estimated dynamic flow rate $R_{e,i}$, which is determined based in the rate ratio $\alpha_i(t)$, which, in turn, is adjusted according to the QoE of the UE 316 receiving flow i.

If the required bandwidth $b_i$ is less than the available bandwidth B, then the remaining bandwidth B is updated in block 614 by subtracting the required bandwidth from the available bandwidth as shown in Equation (12).

$$B=B-b_i \qquad (12)$$

In block 615, the provided throughput C is updated with the bandwidth allocated for flow i. Where the required bandwidth $b_i$ is less than the available bandwidth B, the provided throughput C is updated by increasing the provided throughput by the dynamic effective flow rate of flow $R_{e,i}$ according to Equation (13).

$$C=C+R_{e,i} \qquad (13)$$

Where the required bandwidth $b_i$ is greater than the available bandwidth B, the provided throughput C is updated by increasing the provided throughput by the effective rate of the remaining available bandwidth B according to Equation (14).

$$C=C+B\times S_i \qquad (14)$$

The required bandwidth $b_i$ is determined for each flow by repeating blocks 610 through 615 until the required bandwidth $b_i$ is calculated for all flows, or until the remaining bandwidth B is zero.

In block 616, the overall sum throughput for all of the nodes with node $n_i$ at power level $p_i$ is determined. In an embedment, an overall sum throughout for each power level is determined, and comprises the sum of the throughput of for all nodes at a particular power level. The overall sum throughput $S_{overall}$ for node $n_i$ at power level $p_i$ is then modified by the throughput for the particular node, as shown in Equation (15).

$$S_{overall}=S_{overall}+C \qquad (15)$$

Once the overall sum throughput for the network, when node $n_i$ is set to power level $p_i$, is determined, the next power level for node $n_i$ is selected in block 617 and an overall sum throughput is determined for node $n_i$ operating at the new specified power level. Thus, for a node $n_i$, the network's overall performance is determined at the different power levels for node $n_i$, resulting in an overall sum throughput associated with each power level for the node $n_i$.

After calculating the sum throughput for each node at each power level, the transmit power for each node 314 is determined in block 618. In some embodiments, the transmit power for a node 314 is the power level that provides the greatest throughout for all of the nodes 314. This is determined by identifying the power level for a particular node that provides the greatest overall sum throughput for the network (or all of the nodes 314). Thus, the transmit power for a particular node may be the transmit power for a particular radio node 314 resulting in the greatest sum overall throughput determined in block 616. In other embodiments, for example, where one or more power levels provide throughput that exceeds the capacity of the radio node 314, the transmit power level may be the level that provides the required throughout for a predetermine percentage of flows, or to the greatest number of flows. In an embodiment, the determined transmit power is the same across all of the radio nodes 314 and in other embodiments, the determined transmit power for each node 314 may be different. Additionally, the determined transmit power may be adjusted based on, for example, power levels for adjacent nodes 314 that caused interference between nodes 314, based on traffic adjustments, based on modifications to the flow rate of flows at a node 314, or another factor. In block 620, the node transmit power settings are modified by transmitting the flows at the determined transmit power.

Figure 7:
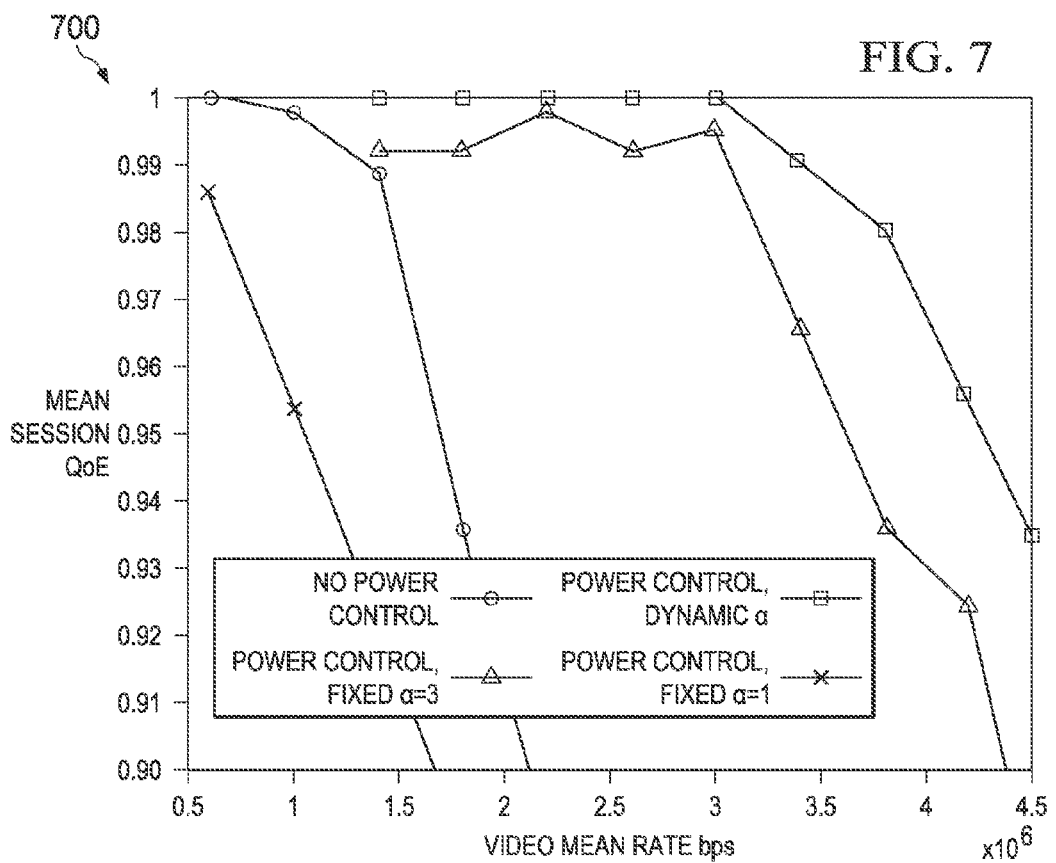
FIG. 7 illustrates simulation results showing the effectiveness of a power control algorithm with fixed and dynamic effective rate estimation according to some embodiments.

FIG. 7 illustrates a chart 700 with simulation results showing the effectiveness of the power control method with fixed and dynamic effective rate estimation according to some embodiments. The main simulation parameters represent a network scenario of 57 randomly deployed radio nodes, 57 randomly dropping users. The performance metric is the percentage of time the real-time video player stops playing. If the freeze time is less than 5%, QoE is 1, otherwise, it is 0. Each real-time video session lasts 3 minutes, where the off time is exponentially distributed with mean of 3 minutes. Total simulation time is 10 minutes, and 5 simulation runs are used for each point in the plot.

The results show that the power control algorithm completely fails if the effective rate is not used (fixed at $\alpha=1$). There is even performance loss compared to the case without power control. If the effective rate is incorrectly estimated (fixed $\alpha=3$), a substantial gain can be obtained. However, the best gain is achieved with dynamic effective rate estimation. At 99% of QoE, an embodiment method gives about 250% gain. Also, the dynamic effective rate method can guide the power control algorithm to track QoE of users. It is thus able to provide a reliable 100% satisfaction for a large range of the data rate.

While the embodiment methods and systems described herein are described in terms of power optimization, other possible applications include admission control, network dimensioning and traffic engineering. Admission control can use an average of the dynamic effective rate to make decision to accept/reject new flows. Traffic engineering can use the dynamic effective rate instead of average rate. Congestion detection can use the dynamic effective rate to determine whether radio nodes can support multiple real-time video flows. Additionally, embodiments may be implemented in 5G networks for power control, admission control, network monitoring, radio coordination, etc.

For example, traffic engineering may be accomplished using the dynamic effective rate of video flows to prioritize video traffic. In such an example, the dynamic estimated effective rate may be calculated for each video flow through, for example, a router or link. The traffic engineering of the video flows is performed based on the effective rate of the video flows, and the remaining capacity for the link is determined using the effective rate of video flows. Traffic engineering may, in some embodiments, be performed on constant bit-rate (CBR) flows, and the remaining link capacity may then be calculated using the mean rate of the video and CBR flows. In instances where no CBR flows exist, the remaining link capacity may be calculated from the mean rate of video flows. Traffic engineering for delay tolerant flows, such as web page requests, may then be performed using the remaining capacity.

Figure 8:
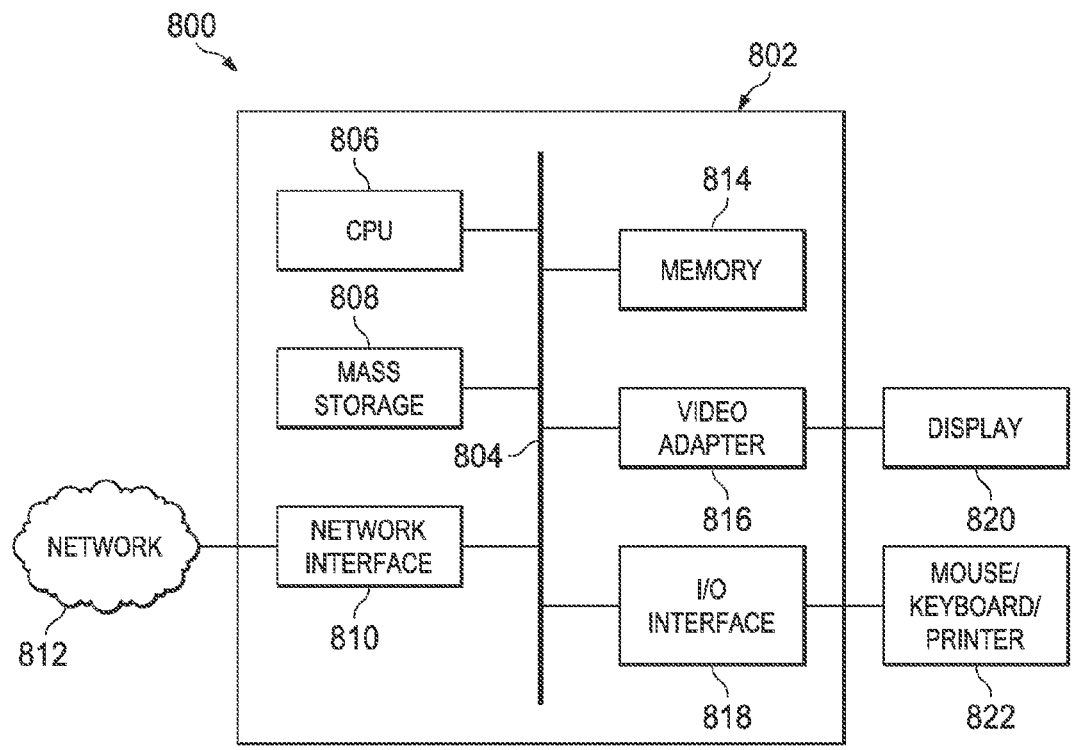
FIG. 8 is a logical diagram illustrating a computing platform that may be used for implementing, for example, the devices and methods described herein, in accordance with an embodiment.

FIG. 8 is a block diagram of a processing system 800 that may be used for implementing the embodiment devices and methods disclosed herein. Specific devices may utilize all of the components shown, or only a subset of the components, and levels of integration may vary from device to device. Furthermore, a device may contain multiple instances of a component, such as multiple processing units 802, processors or central processing units (CPUs) 806, memories 814, transmitters, receivers, etc. The processing system 800 may comprise a processing unit 802 equipped with one or more input/output devices, such as a speaker, microphone, mouse 822, touchscreen, keypad, keyboard 822, printer 822, display 820, and the like. The processing unit 802 may include a CPU 806, memory 814, a mass storage device 808, a video adapter 816, and an I/O interface 818 connected to a bus 804.

The bus 804 may be one or more of any type of several bus architectures including a memory bus or memory controller, a peripheral bus, video bus, or the like. The CPU 806 may comprise any type of electronic data processor. The memory 814 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 814 may include ROM for use at boot-up, and DRAM for program and data storage for use while executing programs.

The mass storage device 808 may comprise any type of non-transitory storage device configured to store data, programs, and other information and to make the data, programs, and other information accessible via the bus 804. The mass storage device 808 may comprise, for example, one or more of a solid state drive, hard disk drive, a magnetic disk drive, an optical disk drive, an array or combinations of any of the same, or the like.

The video adapter 816 and the I/O interface 818 provide interfaces to couple external input and output devices to the processing unit 802. As illustrated, examples of input and output devices include the display 820 coupled to the video adapter 816 and the mouse/keyboard/printer 822 coupled to the I/O interface 818. Other devices may be coupled to the processing unit 802, and additional or fewer interface cards 810 may be utilized. For example, a serial interface such as Universal Serial Bus (USB) (not shown) may be used to provide an interface for a printer.

The processing unit 802 also includes one or more network interfaces 810, which may comprise wired links, such as an Ethernet cable or the like, and/or wireless links to access nodes or different networks 812. The network interface 810 allows the processing unit 802 to communicate with remote units via the networks 812. For example, the network interface 810 may provide wireless communication via one or more transmitters/transmit antennas and one or more receivers/receive antennas. In an embodiment, the processing unit 802 is coupled to a local-area network 812 or a wide-area network 812 for data processing and communications with remote devices, such as other processing units, the Internet, remote storage facilities, or the like.

The elements of the system 300 for implementing a power control method using an estimated effective rate may, in some embodiments, be software components implements on the processing system 800, or across multiple processing systems. In some embodiments, the processing systems 800 have memories 814 with instructions stored thereon for causing the processors 806 to execute the methods described above with respect to the methods 400, 500 and 600 of FIGS. 4 through 6.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for effective flow rate estimation for a plurality of video flows comprising:
   determining a first measured flow rate of each of the plurality of video flows in a first transmission window;
   receiving quality of experience (QoE) feedback for playing portions of the plurality of video flows in the first transmission window, wherein the QoE feedback is received from a plurality of user equipments (UEs) receiving the plurality of video flows;
   determining for each of the plurality of video flows a corresponding second dynamic-to-measured rate ratio according to a respective first dynamic-to-measured rate ratio, the first dynamic-to- measured rate ratio being based on an initial dynamic-to-measured rate ratio, and the initial dynamic-to-measured rate ratio determined based on a statistical peak-to-mean ratio of a respective real-time video flow; and
   estimating a dynamic effective flow rate for each video flow in the plurality of video flows in a second transmission window in accordance with at least the first measured flow rates of the plurality of video flows and the QoE feedback, wherein estimating the dynamic effective flow rate for each video flow comprises multiplying the first measured flow rate of each of the plurality of video flows by the corresponding second dynamic-to-measured rate ratio.

2. The method of claim 1, wherein the determining the second dynamic-to-measured rate ratio for each of the plurality of video flows comprises:
   setting the second dynamic-to-measured rate ratio to a value of the first dynamic-to-measured rate ratio adjusted according to at least the QoE feedback.

3. The method of claim 2, wherein the QoE feedback comprises outage information for the playing the portions of the video flows on the UEs.

4. The method of claim 3, wherein the adjusting the second dynamic-to-measured rate ratios comprises:
   increasing a first one of the second dynamic-to-measured rate ratios for a first flow of the video flows by a step value in response to an outage ratio being less than an outage ratio threshold and further in response to the first one of the second dynamic-to-measured rate ratios being less than a dynamic-to-measured rate ratio threshold, wherein the outage ratio is a ratio of a total outage time of the first flow to a total session time of the first flow; and
   decreasing the first one of the second dynamic-to-measured rate ratios by the step value in response to the outage ratio being smaller than the outage ratio threshold and further in response to an outage time in one or more first transmission windows being less than an outage time threshold.

5. The method of claim 4, wherein the step value is variable.

6. The method of claim 1, wherein the estimating the dynamic effective flow rate comprises:
   estimating the dynamic effective flow rate in accordance with accumulated QoE feedback from a third transmission window and the QoE feedback associated with the first transmission window.

7. The method of claim 1, further comprising:
   transmitting the video flows in the second transmission window, and from a radio node to the plurality of UEs, using transmission parameters resulting in second flow rates at the UEs that correspond to the estimated dynamic effective flow rates.

8. The method of claim 1, wherein the first measured flow rate of each corresponding video flow of the plurality of video flows is representative of a transmitted rate of the corresponding video flow to a corresponding UE of the plurality of UEs receiving the plurality of video flows.

9. The method of claim 1, the estimating comprising:
estimating an effective flow rate for each flow in the plurality of video flows in a second transmission window in accordance with each corresponding first measured flow rate of the plurality of video flows and the QoE feedback; and
estimating the dynamic effective flow rate for multiplexed video flows based on the estimated effective flow rates.

10. A method for power control comprising:
determining measured data rates associated with traffic flows for radio nodes in a network for first transmission windows;
determining for each of the traffic flows a second dynamic-to-measured rate ratio according to a respective first dynamic-to-measured rate ratio and quality of experience (QoE) feedback, the first dynamic-to-measured rate ratio being based on an initial dynamic-to-measured rate ratio, and the initial dynamic-to-measured rate ratio determined based on a statistical peak-to-mean ratio of a respective real-time traffic flow;
estimating a dynamic effective flow rate of each of the traffic flows for a second transmission window and in accordance with at least the QoE feedback from user equipments (UEs) that are connected to the radio nodes and receive the traffic flows, wherein the estimating the dynamic effective flow rate of each of the traffic flows comprises multiplying the associated measured data rate by the second dynamic-to-measured rate ratio of each of the traffic flows; and
setting a transmit power level for each of the radio nodes that maximizes an overall sum throughput of the radio nodes in accordance with the estimated dynamic effective flow rates of the traffic flows.

11. The method of claim 10, wherein the QoE feedback comprises outage information for playing of video of the traffic flows on the UEs.

12. The method of claim 10, further comprising:
determining an overall sum throughput, for each of the radio nodes at each of a plurality of power levels, for the traffic flows though the radio nodes;
wherein determining an overall sum throughput comprises determining a sum throughput, for each radio node at a specified power level, for the traffic flows through the radio nodes, wherein the specified power level comprises the respective one of the plurality of power levels for the respective one of the radio nodes; and
wherein the setting a transmit power level for each of the radio nodes comprises setting the power level to the power level associated with the highest overall sum throughput for the respective one of the radio nodes.

13. The method of claim 12, wherein the determining the sum throughput comprises determining a required bandwidth for each traffic flow through the respective radio node according to the estimated dynamic effective flow rate of the respective traffic flow and a spectral efficiency of the respective traffic flow at the respective power level.

14. A method comprising:
receiving quality of experience (QoE) feedback, at a network component and from a plurality of user equipments (UEs), for a first transmission window, wherein the QoE feedback is associated with traffic flows between a plurality of radio nodes and the UEs;
determining for each of the plurality of traffic flows a second dynamic-to-measured rate ratio according to a respective first dynamic-to-measured rate ratio, the first dynamic-to-measured rate ratio being based on an initial dynamic-to-measured rate ratio, and the initial dynamic-to-measured rate ratio determined based on a statistical peak-to-mean ratio of a respective traffic flow;
estimating, for each of the traffic flows and based on the QoE feedback, a corresponding dynamic effective flow rate for the respective traffic flows in a second transmission window, wherein the estimating the effective dynamic effective flow rate comprises multiplying a first measured flow rate of each of the plurality of traffic flows by the corresponding second dynamic-to-measured rate ratio; and
causing each of the plurality of radio nodes to transmit the traffic flows with the estimated dynamic effective flow rate in the second transmission window.

15. The method of claim 14, further comprising:
setting a transmit power level for each of the radio nodes that maximizes an overall sum throughput of the radio nodes in accordance with the estimated dynamic effective flow rates of the traffic flows,
wherein the causing each of the plurality of radio nodes to transmit the traffic flows comprises causing the plurality of radio nodes to transmit the traffic flows with the estimated dynamic effective flow rates and at the set transmit power levels.

16. The method of claim 15, wherein the setting the transmit power level for each of the plurality of radio nodes comprises:
determining an overall sum throughput, for each radio node at each of a plurality of power levels, for the traffic flows through the radio nodes;
wherein the determining the overall sum throughput comprises determining a sum throughput, for each of the plurality of radio nodes at a specified power level, for the traffic flows through the plurality of radio nodes, wherein the specified power level is the respective one of the plurality of power levels for the respective one of the plurality of radio nodes; and
wherein the transmit power level for each of the plurality of radio nodes comprises the power level associated with the highest overall sum throughput determined for the respective one of the radio nodes.

17. The method of claim 16, wherein the determining the sum throughput comprises:
determining a required bandwidth for each traffic flow through the respective radio node according to the estimated dynamic effective flow rate and a spectral efficiency of the respective traffic flow at the respective power level,
wherein the sum throughout for each radio node is the sum of the required bandwidths for the traffic flows through the respective radio node.

18. The method of claim 14, wherein the estimating the dynamic effective flow rate for each of the traffic flows comprises:
setting for each of the traffic flows a second dynamic-to-measure rate ratio according to a respective first dynamic-to-measured rate ratio that is related to transmissions within the first transmission window, the first dynamic-to-measured rate ratio being based on an initial dynamic-to-measured rate ratio, and the initial dynamic-to-measured rate ratio determined based on a statistical peak-to-mean ratio of a respective real-time traffic flow; and adjusting the second dynamic-to-measured rate ratio according to at least the QoE feedback.

19. The method of claim 18, wherein the adjusting the second dynamic-to-measured rate ratios comprises:

adjusting a first one of the second dynamic-to-measured rate ratios for a first flow of the traffic flows by a variable adjustment step according to a relationship of at least one or more outage thresholds to an outage criteria related to the QoE feedback.

20. The method of claim 14, wherein the QoE feedback comprises outage information for playing of video of the traffic flows on the plurality of UEs.

21. A method for effective flow rate estimation for transmission of a video flow, the method comprising:

determining a measured flow rate associated with the transmission of the video flow in a first transmission window;

receiving Quality of Experience (QoE) feedback from a User Equipment (UE) receiving the video flow, the QoE feedback associated with quality factors associated with playback of a portion of the video flow during the first transmission window;

determining a second dynamic-to-measured rate ratio according to a first dynamic-to-measured rate ratio, the first dynamic-to-measured rate ratio being based on an initial dynamic-to-measured rate ratio, and the initial dynamic-to-measured rate ratio determined based on a statistical peak-to-mean ratio of the video flow; and estimating a dynamic effective flow rate for the video flow in a second transmission window in accordance with the determined flow rate and the received QoE feedback, wherein the estimating the dynamic effective flow rate comprises multiplying the measured flow rate by the second dynamic-to-measured rate ratio.

22. The method of claim 21 wherein:

the video flow is one of a plurality of video flows, the step of determining is performed for each of the video flows in the plurality, the step of receiving is performed for each of the video flows in the plurality, and the step of estimating includes estimating the dynamic effective flow rate for the plurality of video flows in accordance with the plurality of determined flow rates and the plurality of received feedback.

23. A network component comprising:

a processor; and a non-transitory computer readable medium connected to the processor and having stored thereon instructions that when executed by the processor cause the network component to:

determine a first measured flow rate of each of a plurality of video flows in a first transmission window;

receive quality of experience (QoE) feedback associated with playback of portions of the plurality of video flows in the first transmission window, wherein the QoE feedback is received from a plurality of user equipments (UEs) receiving the plurality of video flows;

determine for each of the plurality of video flows a corresponding second dynamic-to-measured rate ratio according to a respective first dynamic-to-measured rate ratio, the first dynamic-to-measured rate ratio being based on an initial dynamic-to-measured rate ratio, and the initial dynamic-to-measured rate ratio determined based on a statistical peak-to-mean ratio of a respective real-time video flow; and estimate a dynamic effective flow rate for each flow in the plurality of video flows in a second transmission window in accordance with at least the first measured flow rates of the plurality of video flows and the QoE feedback by multiplying the first measured flow rate of each of the plurality of video flows by the corresponding second dynamic-to-measured rate ratio.

* * * * *